United States Patent
Knafel et al.

(10) Patent No.: US 10,439,824 B2
(45) Date of Patent: Oct. 8, 2019

(54) METHOD FOR AUTHENTICATING AN INSTRUMENT FOR PROCESSING A BIOLOGICAL SAMPLE OR REAGENT AND SYSTEM COMPRISING AN INSTRUMENT FOR PROCESSING A BIOLOGICAL SAMPLE OR REAGENT

(71) Applicant: Roche Diagnostics Operations, Inc., Indianapolis, IN (US)

(72) Inventors: Andrzej Knafel, Walchwil (CH); Thomas Weingartner, Allenwinden (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 92 days.

(21) Appl. No.: 15/687,567

(22) Filed: Aug. 28, 2017

(65) Prior Publication Data
US 2018/0062857 A1    Mar. 1, 2018

(30) Foreign Application Priority Data

Sep. 1, 2016 (EP) ..................................... 16186835

(51) Int. Cl.
*H04L 9/00* (2006.01)
*H04L 9/32* (2006.01)
*H04L 29/06* (2006.01)

(52) U.S. Cl.
CPC .......... *H04L 9/3263* (2013.01); *H04L 9/3226* (2013.01); *H04L 9/3231* (2013.01); *H04L 9/3247* (2013.01); *H04L 63/0823* (2013.01)

(58) Field of Classification Search
None
See application file for complete search history.

(56) References Cited

U.S. PATENT DOCUMENTS

| 6,640,246 B1 | 10/2003 | Gary, Jr. et al. |
| 2004/0167465 A1 | 8/2004 | Mihai et al. |
| 2004/0177246 A1 | 9/2004 | Balaz et al. |

(Continued)

FOREIGN PATENT DOCUMENTS

| EP | 2299277 A1 | 3/2011 |
| WO | 2000/072506 A1 | 11/2000 |

*Primary Examiner* — Alexander Lagor
(74) *Attorney, Agent, or Firm* — Roche Diagnostics Operations, Inc.

(57) ABSTRACT

A method for authenticating an instrument for processing a biological sample or reagent is disclosed. The method comprises generating a PIN code by the instrument, entering the PIN code and identification data associated with the instrument in a database of an electronic device, verifying the PIN code and identification data at the electronic device, transmitting an authentication certificate to the instrument if the PIN code and identification data correspond to target data stored in the database, installing the authentication certificate on the instrument, whereby the instrument is registered with the electronic device, and using the authentication certificate for an encrypted communication between the instrument and the electronic device. Further, a system is disclosed which comprises an instrument for processing a biological sample or reagent and an electronic device. The system is configured to carry out each step of the method.

12 Claims, 1 Drawing Sheet

(56) References Cited

U.S. PATENT DOCUMENTS

| | | | |
|---|---|---|---|
| 2008/0201213 A1* | 8/2008 | Lee | G06Q 20/20 |
| | | | 705/14.38 |
| 2010/0115279 A1* | 5/2010 | Frikart | G06F 19/3418 |
| | | | 713/171 |
| 2013/0218779 A1 | 8/2013 | Kirillin et al. | |
| 2015/0295892 A1* | 10/2015 | Fox | H04L 63/0823 |
| | | | 726/15 |

* cited by examiner

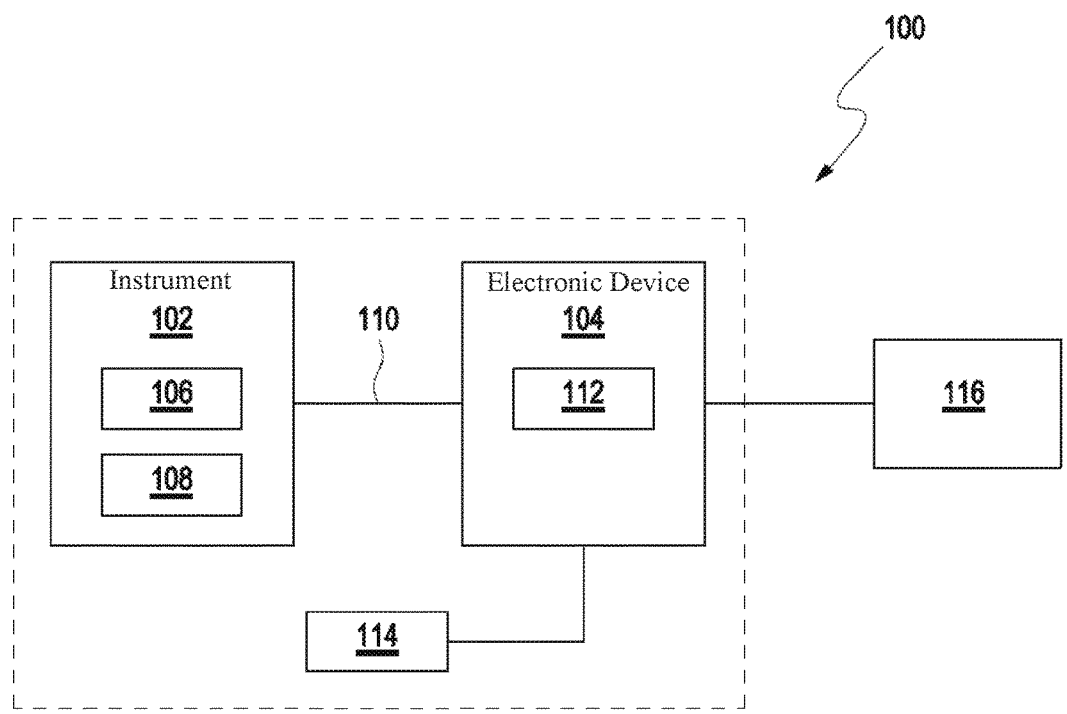

METHOD FOR AUTHENTICATING AN INSTRUMENT FOR PROCESSING A BIOLOGICAL SAMPLE OR REAGENT AND SYSTEM COMPRISING AN INSTRUMENT FOR PROCESSING A BIOLOGICAL SAMPLE OR REAGENT

CROSS-REFERENCE TO RELATED APPLICATIONS

This application is a continuation of EP 16186835.1, filed Sep. 1, 2016, which is hereby incorporated by reference.

BACKGROUND

The present disclosure relates to a method for authenticating an instrument for processing a biological sample or reagent and a system comprising an instrument for processing a biological sample or reagent.

In vitro diagnostic testing has a major effect on clinical decisions, providing physicians with pivotal information. Particularly, there is great emphasis on providing quick and accurate test results in critical care settings. In vitro diagnostic testing is usually performed using instruments operable to execute one or more processing steps/workflow steps on one or more biological samples and/or one or more reagents, such as pre-analytical instruments, post-analytical instruments and also analytical instruments.

Analytical instruments/analyzers are configured to obtain a measurement value. An analyzer is operable to determine via various chemical, biological, physical, optical or other technical procedures a parameter value of the sample or a component thereof. An analyzer may be operable to measure the parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types.

An analytical instrument may comprise units assisting with the pipetting, dosing, and mixing of samples and/or reagents. The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. It may comprise a consumable feeding unit.

The analyzer may comprise a process and detection system whose workflow is optimized for certain types of analysis. Examples of such analyzer are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

Such instruments need to be registered to build up a trust relationship to electronic devices for safe communication purposes therewith. For example, such instruments need to be registered to build up a trust relationship to remote electronic devices from the manufacturer of the instruments in order to properly operate. Such remote electronic devices are devices which are spatially separated from the instrument. The instrument and the remote electronic device may communicate with each other such as by a wireless LAN connection. The trust relationship may also be built up to other local electronic devices, e.g., data management systems of laboratory automation systems on the same LAN connection. For this purpose, current instruments provide for a user to enter a Personal Identification Number (PIN) on the device. However, a significant number of instruments do not have a possibility such as a keyboard to enter numbers and/or characters.

Therefore, there is a need for a possibility to build up a trust relationship to an electronic device, particularly to a remote electronic device from a manufacturer of the instrument, independent on whether the instrument provides a device for entering numbers and/or characters.

SUMMARY

According to the present disclosure, a computer implemented method for authenticating an instrument for processing a biological sample or reagent is presented. The computer implemented method can comprise generating a Personal Identification Number (PIN) code by the instrument, registering the PIN code and identification data associated with the instrument in a database of an electronic device, verifying the PIN code and identification data at the electronic device, transmitting an authentication certificate to the instrument if the PIN code and identification data correspond to target data stored in the database, installing the authentication certificate on the instrument, wherein the instrument is registered with the electronic device, and using the authentication certificate for an encrypted communication between the instrument and the electronic device In accordance with one embodiment of the present disclosure, a system is presented. The system can comprise an instrument for processing a biological sample or reagent and an electronic device. The system is configured to carry out the above method.

Accordingly, it is a feature of the embodiments of the present disclosure to provide a possibility to build up a trust relationship to an electronic device, particularly to a remote electronic device from a manufacturer of the instrument, independent on whether the instrument provides a device for entering numbers and/or characters. Other features of the embodiments of the present disclosure will be apparent in light of the description of the disclosure embodied herein.

BRIEF DESCRIPTION OF THE VIEW OF THE DRAWING

The following detailed description of specific embodiments of the present disclosure can be best understood when read in conjunction with the following drawing, where like structure is indicated with like reference numerals and in which:

FIG. 1 illustrates a schematic view of a system according to an embodiment of the present disclosure.

DETAILED DESCRIPTION

In the following detailed description of the embodiments, reference is made to the accompanying drawing that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

As used in the following, the terms "have", "comprise" or "include" or any arbitrary grammatical variations thereof can be used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it can be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "particularly", "more particularly", "specifically", "more specifically" or similar terms are used in conjunction with additional/alternative features, without restricting alternative possibilities. Thus, features introduced by these terms are additional/alternative features and may not be intended to restrict the scope of the claims in any way. The present disclosure may, as the skilled person will recognize, be performed by using alternative features. Similarly, features introduced by "in an embodiment of the present disclosure" or similar expressions are intended to be additional/alternative features, without any restriction regarding alternative embodiments of the present disclosure, without any restrictions regarding the scope of the present disclosure and without any restriction regarding the possibility of combining the features introduced in such way with other additional/alternative or non-additional/alternative features of the present disclosure.

According to the disclosed computer implemented method for authenticating an instrument for processing a biological sample or reagent, the method can comprise generating a PIN code by the instrument, registering the PIN code and identification data associated with the instrument in in a database of an electronic device such as a remote electronic device, verifying the PIN code and identification data at the electronic device, transmitting an authentication certificate to the instrument if the PIN code and identification data correspond to target data stored in the database, installing the authentication certificate on the instrument, whereby the instrument is registered with the electronic device, and using the authentication certificate for an encrypted communication between the instrument and the electronic device.

Thus, the disclosed method can allow establishment of encrypted communication between an instrument and an electronic device such as a remote electronic device even though the instrument does not provide for a possibility to enter anything.

The term "instrument" as used herein can refer to any apparatus or apparatus component operable to execute one or more processing steps/workflow steps on one or more biological samples and/or one or more reagents. The expression 'processing steps' thereby can refer to physically executed processing steps such as centrifugation, aliquotation, sample analysis and the like. The term 'instrument' can cover pre-analytical instruments, post-analytical instruments and also analytical instruments. Thus, the term "instrument" can be used synonymous with the term "laboratory instrument".

The term 'analyzer'/'analytical instrument' as used herein can encompass any apparatus or apparatus component configured to obtain a measurement value. An analyzer can be operable to determine via various chemical, biological, physical, optical or other technical procedures a parameter value of the sample or a component thereof. An analyzer may be operable to measure the parameter of the sample or of at least one analyte and return the obtained measurement value. The list of possible analysis results returned by the analyzer can comprise, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types. An analytical instrument may comprise units assisting with the pipetting, dosing, and mixing of samples and/or reagents. The analyzer may comprise a reagent holding unit for holding reagents to perform the assays. Needless to say, the analyzer may comprise a hand-held device for holding the reagents. Reagents may be arranged, for example, in the form of containers or cassettes containing individual reagents or group of reagents, placed in appropriate receptacles or positions within a storage compartment or conveyor. It may comprise a consumable feeding unit. The analyzer may comprise a process and detection system whose workflow can be optimized for certain types of analysis. Examples of such analyzer are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

The term "authentication certificate" as used herein can refer to a digital set of data confirming predetermined characteristics of an object. The authenticity and integrity thereof may be verified by cryptographic methods. The authentication certificate can include the data necessary for its verification. The authentication certificate can be generated by an official certification authority. For example, the authentication certificate may be a so-called public key certificate. Such a certificate includes information about the key, information about its owner's identity, and the digital signature of an entity that has verified the certificate's contents can be correct.

The method may further comprise generating a certificate signing request, sending the certificate signing request to a certificate authority connected to the electronic device, signing the certificate signing request by the certificate authority, generating the authentication certificate and sending the authentication certificate to the instrument. Thus, the verification and transmittal of the authentication certificate can be facilitated. It can be noted that the certificate signing request can include the public key generated on the instrument, such as the analyzer, requiring the registration. The key-pair comprising private key and public key can be generated prior to sending the certificate signing request and the public key can be included in the certificate signing request, wherein the private key can stay on the instrument.

The method may further comprise encrypting the certificate signing request, sending the encrypted certificate signing request to the electronic device, decrypting the certificate signing request before signing the certificate signing request, encrypting the authentication certificate, sending the encrypted authentication certificate to the instrument, and decrypting the authentication certificate by the instrument. Thus, the safety of the data exchange can be increased. It can be noted that the PIN may be used for encryption and/or decryption. Alternatively, the regular process can provide that a certificate on the instrument installed during the production can be used in the encryption process and the PIN can be encrypted.

The method may further comprise decrypting the certificate signing request by the electronic device and sending the certificate signing request decrypted by the electronic device to the certificate authority. Thus, a safe transmission of the request to the electronic device can be ensured.

The method may further comprise encrypting the authentication certificate with itself and a previous authentication certificate of the instrument. Thus, a reliable encryption of the request can be provided.

Installing the authentication certificate on the instrument may include replacing the previous authentication certificate of the instrument. Thus, the authentication certificate can be updated which can ensure a renewal of the encrypted communication between the instrument and the electronic device.

The method may further comprise encrypting the certificate signing request with at least the previous authentication certificate. Thus, a safe transmission of the request can be provided which can decrease the risk of any fraud requests.

The PIN code and identification data may be entered by an input device separate from the instrument and the electronic device. Thus, the instrument may not need to provide a possibility for entering data necessary for the registration but the registration process may be carried out with any external input device. The input device may be connected to the electronic device by an online connection. Thus, fast communication between the input device and the electronic device can be provided. For example, the input device may be a portal of the electronic device. Thus, a convenient way for entering for entering data necessary for the registration can be provided.

The method may further comprise connecting the instrument to the electronic device by an online connection and transmitting the authentication certificate to the instrument via the online connection. Thus, a convenient possibility for an exchange of data between these devices can be provided.

The method may further comprise displaying the generated PIN on a display of the instrument. Thus, a user of the instrument can get information necessary for safe login to the instrument and registration of the instrument.

The identification data can include a model and/or serial number of the instrument. Thus, the authenticity of the instrument may be unambiguously verified.

According to the system disclosed, the system can comprise an instrument for processing a biological sample or reagent and an electronic device. The system can be configured to carry out the method as described above.

The instrument may be configured to generate a PIN code. The electronic device can comprise a database. The PIN code and identification data associated with the instrument can be enterable in the database. The electronic device can be configured to verify the PIN code and identification data and to transmit an authentication certificate to the instrument if the PIN code and identification data correspond to target data stored in the database. The authentication certificate can be configured to be installed on the instrument. The authentication certificate can be configured to be used for encrypted communication between the instrument and the electronic device. Thus, the disclosed system can establish encrypted communication between an instrument and an electronic device even though the instrument may not provide for a possibility to enter anything.

The system may further comprise an input device separate from the instrument and the electronic device. The PIN code and identification data can be enterable by the input device. Thus, the system can allow entrance of the PIN code and the identification independent of whether the instrument has a possibility to do so or not.

The instrument may be connected to the electronic device by an online connection. The authentication certificate can be transmittable to the instrument via the online connection. Thus, a convenient connection between the instrument and the electronic device can be provided.

The instrument may comprise a display. The display can be configured to display the generated PIN. Thus, a user of the instrument can get information necessary for safe login to the instrument and registration of the instrument.

The identification data can include a model and/or serial number of the instrument. Thus, the authenticity of the instrument may be unambiguously verified.

The present disclosure can further disclose and propose a computer program including computer-executable instructions for performing the method according to the disclosed method/system in one or more of the embodiments enclosed herein when the program can be executed on a computer or computer network. Specifically, the computer program may be stored on a computer-readable data carrier. Thus, specifically, one, more than one or even all of the method steps as indicated above may be performed by using a computer or a computer network, in particular by using a computer program.

The present disclosure can further disclose and propose a computer program product having program code, in order to perform the method according to the disclosed method/system in one or more of the embodiments enclosed herein when the program is executed on a computer or computer network. Specifically, the program code may be stored on a computer-readable data carrier.

Further, the present disclosure can disclose and propose a data carrier having a data structure stored thereon, which, after loading into a computer or computer network, such as into a working memory or main memory of the computer or computer network, may execute the method according to one or more of the embodiments disclosed herein.

The present disclosure can further propose and disclose a computer program product with program code stored on a machine-readable carrier, in order to perform the method according to one or more of the embodiments disclosed herein, when the program can be executed on a computer or computer network. As used herein, a computer program product can refer to the program as a tradable product. The product may generally exist in an arbitrary format, such as in a paper format, or on a computer-readable data carrier. Specifically, the computer program product may be distributed over a data network.

Finally, the present disclosure can propose and disclose a modulated data signal which can contain instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network.

Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the disclosed method/system can further disclose:

a computer or computer network comprising at least one processor, wherein the processor can be adapted to perform the method according to one of the embodiments described in this description, a computer loadable data structure that can be adapted to perform the method according to one of the embodiments described in this description while the data structure is being executed on a computer, a computer program, wherein the computer program can be adapted to perform the method according to one of the embodiments described in this description while the program can be being executed on a computer, a computer program comprising a program for performing the method according to one of the embodiments described in this description while the computer program is being executed on a computer or on a computer network, a computer program comprising a program according to the preceding embodiment, wherein the program can be stored on a storage medium readable to a computer, a storage medium, wherein a data structure can be stored on the storage medium and wherein the data structure can be adapted to perform the method according to one of the embodiments described in this description after having been loaded into a main and/or working storage of a computer or of a computer network, and a computer program product having a program code, wherein the program code can be stored or are stored on a storage medium, for performing the method according to one of the embodiments described in this description, if the program code are executed on a computer or on a computer network.

A computer implemented method for authenticating an instrument for processing a biological sample or reagent can comprise generating a PIN code by the instrument, registering the PIN code and identification data associated with the instrument in in a database of an electronic device, verifying the PIN code and identification data at the electronic device, transmitting an authentication certificate to the instrument if the PIN code and identification data correspond to target data stored in the database, installing the authentication certificate on the instrument, whereby the instrument is registered with the electronic device, and using the authentication certificate for an encrypted communication between the instrument and the electronic device.

The method can further comprise generating a certificate signing request, sending the certificate signing request to a certificate authority connected to the electronic device, signing the certificate signing request by the certificate authority, generating the authentication certificate and sending the authentication certificate to the instrument.

The method can further comprise encrypting the certificate signing request, sending the encrypted certificate signing request to the electronic device, decrypting the certificate signing request before signing the certificate signing request, encrypting the authentication certificate, sending the encrypted authentication certificate to the instrument, and decrypting the authentication certificate by the instrument.

The method can further comprise decrypting the certificate signing request by the electronic device and sending the certificate signing request decrypted by the electronic device to the certificate authority.

The method can further comprise encrypting the authentication certificate with itself and a previous authentication certificate of the instrument. Installing the authentication certificate on the instrument can include replacing the previous authentication certificate of the instrument.

The method can further comprise encrypting the certificate signing request with at least the previous authentication certificate.

The PIN code and identification data can be entered by an input device separate from the instrument and the electronic device. The input device can be connected to the electronic device by an online connection. The input device can be a portal of the electronic device.

The method can further comprise connecting the instrument to the electronic device by an online connection and transmitting the authentication certificate to the instrument via the online connection.

The method can further comprise displaying the generated PIN on a display of the instrument.

The identification data can include a model and/or serial number of the instrument.

A system can comprise an instrument for processing a sample or reagent and an electronic device. The system can be configured to carry out the method described above.

The instrument can be configured to generate a PIN code. The electronic device can comprise a database. The PIN code and identification data associated with the instrument can be enterable in the database. The electronic device can be configured to verify the PIN code and identification data and to transmit an authentication certificate to the instrument if the PIN code and identification data correspond to target data stored in the database. The authentication certificate can be configured to be installed on the instrument. The authentication certificate can be configured to be used for encrypted communication between the instrument and the electronic device.

The system can further comprise an input device separate from the instrument and the electronic device. The PIN code and identification data can be enterable by the input device. The instrument can be connected to the electronic device by an online connection. The authentication certificate can be transmittable to the instrument via the online connection. The instrument can comprise a display. The display can be configured to display the generated PIN. The identification data can include a model and/or serial number of the instrument.

FIG. 1 shows a schematic view of a system 100. The system 100 can comprise an instrument 102 for processing a biological sample or reagent and an electronic device 104 such as a remote electronic device. The instrument 102 can comprise a computing device 106. The computing device 106 can be configured to control units (not shown in detail) assisting with workflows to be carried out by the instrument 102. The instrument 102 can comprise a display 108. The instrument 102 may not have a keyboard or any other interface allowing input of numbers and/or characters into the computing device 106. Thus, the instrument 102 can be configured to display information by the display 108 but may not allow a user to input any instructions, control orders, numbers, characters, or the like.

The electronic device 104 may be a service center or credential management service center of a manufacturer of the instrument 102. The instrument 102 can be connected to the electronic device 104 by an online connection 110. The electronic device 104 can comprise a database 112. The system 100 can further comprise an input device 114 separate from the instrument 102 and the electronic device 104. The input device 114 can be configured to allow input into the database 112. The input device 114 can be a portal of the electronic device 104 such as a website. The input device 114 can comprise a keyboard, touchscreen, or any other interface for allowing entering of data in the database 112. The input device 114 may be a computing device such as a PC, laptop, notebook or the like.

For a proper operation of the instrument 102, it can be necessary to authenticate the instrument 102. For this purpose, the system 100 can provide for at least the following configuration. The instrument 102 can be configured to generate a Personal Identification Number (PIN) code. More particularly, the display 108 can be configured to display the generated PIN. The PIN code and identification data associated with the instrument 102 can be entered in the database 112 by the input device 114. The identification data can include a model of the instrument 102. Alternatively, or in addition, the identification data can include a serial number of the instrument 102. The electronic device 104 can be configured to verify the PIN code and identification data and to transmit an authentication certificate to the instrument 102 via the online connection 110 if the PIN code and identification data correspond to target data stored in the database 112. The authentication certificate can be configured to be installed on the instrument 102. The authentication certificate can be configured to be used for encrypted communication between the instrument 102 and the electronic device 104.

Hereinafter, a method for authenticating the instrument 102 will be described in further detail. A user of the instrument 102 can switch the instrument 102 on. The instrument 102 can generate a PIN code and display the same on the display 108. The user can start to login to the database 112 using login information. The login information can be forwarded to the user of the instrument 102 beforehand. The login information may be forwarded by an electronic message such as an e-mail, SMS, or the like. After login, the user can enter the PIN code and identification data associated with the instrument 102 in the database 112 by the input device 114. Thereafter, the PIN code and identification data associated with the instrument 102 can be verified at the electronic device 104. If the PIN code and identification data associated with the instrument 102 correspond to target data stored in the database 112, an authentication certificate can be transmitted to the instrument 102 via the online connection 110.

The verification of the PIN code and identification data associated with the instrument 102 and the transmittal of the authentication certificate may be carried out as follows. A certificate signing request can be generated by the instrument 102. The certificate signing request can be encrypted with at least a previous authentication certificate of the instrument 102 which may be pre-installed such as when the instrument 102 is sold. In this case, the certificate signing request can also include the encrypted PIN. As an alternative, the PIN may be used directly for encryption. The encrypted certificate signing request can be sent to the electronic device 104. The electronic device 104 can decrypt the certificate signing request and send the certificate signing request decrypted by the electronic device 104 to a certificate authority 116 connected to the electronic device 104. The certificate authority 116 may be operated by the manufacturer of the instrument 102 or by another provider. The certificate authority 116 can sign the certificate signing request. Thus, the certificate signing request can be decrypted before being signed by the certificate authority 116. Then an authentication certificate can be generated by the certificate authority 116 and sent to the electronic device 104. The authentication certificate can be encrypted by the electronic device 104. Particularly, the authentication certificate can be encrypted with itself and/or the previous authentication certificate of the instrument 102. Both can be valid encryption procedures, the first one with the public key included in the certificate signing request and the second one with the previous certificate, wherein both encryptions may be applied together. The encrypted authentication certificate can then be sent to the instrument 102. The authentication certificate can be decrypted by the instrument 102. Particularly, as the instrument may still comprise the previous authentication certificate, it may decrypt the authentication certificate. If the newly generated public key would be used for encryption by the electronic device 104, then the instrument 102 can use the private key for decryption. Subsequently, the authentication certificate can be installed on the instrument 102, whereby the instrument 102 can be registered with the electronic device 104. Installing the authentication certificate can include replacing the previous authentication certificate of the instrument 102. After being installed, the authentication certificate can be used for an encrypted communication between the instrument 102 and the electronic device 104. Thus, the instrument 102 may properly operate and receive full support from the electronic device 104.

It can be noted that if the user of the instrument 102 does not have access to the input device 114, the user may contact a service center of the electronic device 104 where a supporter may enter the PIN code and the identification data on the user's behalf. The remaining method may be carried out as described above.

The instrument 102 can be configured to generate a PIN code. The electronic device 104 can comprise a database 112. The PIN code and identification data associated with the instrument 102 can be entered in the database 112. The electronic device 104 can be configured to verify the PIN code and identification data and to transmit an authentication certificate to the instrument 102 if the PIN code and identification data correspond to target data stored in the database 112. The authentication certificate can be configured to be installed on the instrument 102. The authentication certificate can be configured to be used for encrypted communication between the instrument 102 and the electronic device 104.

The system 100 can further comprise an input device 114 separate from the instrument 102 and the electronic device 104. The PIN code and identification data can be entered by the input device 114.

The instrument 102 can be connected to the electronic device 104 by an online connection 110. The authentication certificate can be transmittable to the instrument 102 via the online connection 110. The instrument 102 can comprise a display 108. The display 108 can be configured to display the generated PIN. The identification data can include a model and/or serial number of the instrument 102.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A computer implemented method for authenticating an instrument for processing a biological sample or reagent, the computer implemented method comprising:
generating a Personal Identification Number (PIN) code by the instrument;
registering the PIN code and identification data associated with the instrument in a database of an electronic device;
verifying the PIN code and identification data at the electronic device by
generating a certificate signing request by the instrument,
encrypting the certificate signing request,
sending the encrypted certificate signing request to a certificate authority connected to the electronic device,
signing the certificate signing request by the certificate authority after decrypting the certificate signing request,
generating the authentication certificate,
encrypting the authentication certificate with itself and a previous authentication certificate of the instrument;
transmitting the encrypted authentication certificate to the instrument if the PIN code and identification data correspond to target data stored in the database;
decrypting the authentication certificate by the instrument;
installing the authentication certificate on the instrument, wherein the instrument is registered with the electronic device; and
using the authentication certificate for an encrypted communication between the instrument and the electronic device.

2. The computer implemented method according to claim 1, further comprising;
decrypting the certificate signing request by the electronic device; and
sending the certificate signing request decrypted by the electronic device to the certificate authority.

3. The computer implemented method according to claim 1, wherein installing the authentication certificate on the instrument includes replacing the previous authentication certificate of the instrument.

4. The computer implemented method according to claim 1, further comprising;
encrypting the certificate signing request with at least the previous authentication certificate.

5. The computer implemented method according to claim 1, wherein the PIN code and identification data are entered by an input device separate from the instrument and the electronic device.

6. The computer implemented method according to claim 5, wherein the input device is connected to the electronic device by an online connection.

7. The computer implemented method according to claim 5, wherein the input device is a portal of the electronic device.

8. The computer implemented method according to claim 1, further comprising;
connecting the instrument to the electronic device by an online connection; and
transmitting the authentication certificate to the instrument via the online connection.

9. The computer implemented method according to claim 1, further comprising;
displaying the generated PIN on a display of the instrument.

10. The computer implemented method according to claim 1, wherein the identification data include a model and/or serial number of the instrument.

11. A system, the system comprising:
an instrument for processing a biological sample or reagent; and
an electronic device, wherein the system is configured to carry out the method according to claim 1.

12. The system according to claim 11, wherein the instrument is configured to generate a PIN code, wherein the electronic device comprises a database, wherein the PIN code and identification data associated with the instrument are enterable in the database, wherein the electronic device is configured to verify the PIN code and identification data and to transmit an authentication certificate to the instrument if the PIN code and identification data correspond to target data stored in the database, wherein the authentication certificate is configured to be installed on the instrument, and wherein the authentication certificate is configured to be used for encrypted communication between the instrument and the electronic device.

* * * * *